US012566478B2

(12) United States Patent
Liu

(10) Patent No.: US 12,566,478 B2
(45) Date of Patent: Mar. 3, 2026

(54) ELECTRONIC DEVICE

(71) Applicant: VIVO MOBILE COMMUNICATION CO., LTD., Dongguan (CN)

(72) Inventor: Ninglin Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 137 days.

(21) Appl. No.: 18/757,940

(22) Filed: Jun. 28, 2024

(65) Prior Publication Data

US 2024/0353900 A1 Oct. 24, 2024

Related U.S. Application Data

(63) Continuation of application No. PCT/CN2022/142585, filed on Dec. 28, 2022.

(30) Foreign Application Priority Data

Dec. 29, 2021 (CN) .......................... 202111646679.8

(51) Int. Cl.
*G06F 1/16* (2006.01)
*F16H 7/02* (2006.01)
(52) U.S. Cl.
CPC ........... *G06F 1/1681* (2013.01); *F16H 7/023* (2013.01); *G06F 1/1652* (2013.01)
(58) Field of Classification Search
CPC combination set(s) only.
See application file for complete search history.

(56) References Cited

U.S. PATENT DOCUMENTS 6,222,507 B1 * 4/2001 Gouko .................. G06F 1/1647
361/679.04
7,375,954 B2 * 5/2008 Yang ..................... G06F 1/1622
248/920

(Continued)

FOREIGN PATENT DOCUMENTS

CN 110266836 A 9/2019
CN 110784567 A 2/2020
(Continued)

OTHER PUBLICATIONS

Extended European Search Report issued in related European Application No. 22914845.7, mailed Mar. 20, 2025, 9 pages.
(Continued)

*Primary Examiner* — Lisa Lea-Edmonds
(74) *Attorney, Agent, or Firm* — IPX PLLC

(57) ABSTRACT

An electronic device, including a first device body, a second device body, a rotating mechanism, and a flexible display screen, is disclosed. The flexible display screen comprises a first display screen, a second display screen, and a third display screen. The first device body is rotationally connected to the second device body through a rotating mechanism. The first display screen is connected to the second display screen through the third display screen. The first device body is connected to the first display screen, and the second device body is connected to the second display screen. The rotating mechanism includes a rotating shaft, a transmission apparatus, and a moving component equipped with a first transmission tooth that meshes with the transmission apparatus, the rotating shaft is connected to the moving component through the transmission apparatus, and the first device body or the second device body is connected to the moving component.

12 Claims, 13 Drawing Sheets

(56)                References Cited

U.S. PATENT DOCUMENTS

| | | | | |
|---|---|---|---|---|
| 8,018,715 | B2 * | 9/2011 | Chang | G06F 1/1647 |
| | | | | 361/679.04 |
| 8,854,278 | B2 * | 10/2014 | Parker | G06F 1/1647 |
| | | | | 348/794 |
| 9,696,760 | B1 * | 7/2017 | Zhang | G06F 1/1652 |
| 10,082,832 | B1 * | 9/2018 | Wang | G06F 1/1681 |
| 10,168,739 | B1 * | 1/2019 | Chen | G06F 1/1616 |
| 10,817,020 | B1 * | 10/2020 | DeMaio | G06F 3/1423 |
| 10,831,243 | B2 * | 11/2020 | Kim | G06F 1/1652 |
| 11,729,929 | B2 * | 8/2023 | Zhang | G09F 9/301 |
| | | | | 361/807 |
| 11,846,991 | B2 * | 12/2023 | Feng | G06F 1/1637 |
| 11,960,332 | B2 * | 4/2024 | Huang | G06F 1/1681 |
| 12,405,636 | B2 * | 9/2025 | Kim | G06F 1/1684 |
| 2007/0247798 | A1 * | 10/2007 | Scott | G06F 1/1647 |
| | | | | 361/679.04 |
| 2017/0192459 | A1 * | 7/2017 | Zhang | G06F 1/1652 |
| 2019/0339745 | A1 * | 11/2019 | Chen | H04M 1/0264 |
| 2020/0326751 | A1 * | 10/2020 | Kim | G06F 1/1616 |
| 2020/0352044 | A1 | 11/2020 | Hsu | |
| 2021/0080999 | A1 * | 3/2021 | Bryant | G06F 1/1641 |
| 2021/0149436 | A1 * | 5/2021 | Myung | G06F 1/162 |
| 2023/0090418 | A1 * | 3/2023 | Huang | H04M 1/0268 |
| 2023/0100341 | A1 * | 3/2023 | Feng | G06F 1/1624 |
| | | | | 361/679.27 |
| 2024/0061470 | A1 * | 2/2024 | Kim | G06F 1/1616 |
| 2024/0345631 | A1 * | 10/2024 | Yang | G06F 1/1652 |
| 2024/0353900 | A1 * | 10/2024 | Liu | H04M 1/0216 |
| 2024/0357756 | A1 * | 10/2024 | Zhang | F16C 11/04 |
| 2024/0357757 | A1 * | 10/2024 | Liu | G06F 1/1641 |
| 2024/0385660 | A1 * | 11/2024 | Zeng | H04M 1/0268 |

FOREIGN PATENT DOCUMENTS

| | | |
|---|---|---|
| CN | 112901645 A | 6/2021 |
| CN | 113012569 A | 6/2021 |
| CN | 113315858 A | 8/2021 |
| CN | 113794792 A | 12/2021 |
| CN | 114244936 A | 3/2022 |
| WO | 2021082554 A1 | 5/2021 |

OTHER PUBLICATIONS

International Search Report and Written Opinion issued in corresponding International Application No. PCT/CN2022/142585, mailed Mar. 10, 2023, 9 pages.

First Office Action issued in related Chinese Application No. 202111646679.8, mailed Oct. 13, 2023, 5 pages.

Second Office Action issued in related Chinese Application No. 202111646679.8, mailed Apr. 26, 2024, 5 pages.

* cited by examiner 101          320     314          210     220          314     330          101

301

302

ELECTRONIC DEVICE

CROSS-REFERENCE TO RELATED APPLICATIONS

This application is a continuation of International Application No. PCT/CN2022/142585, filed on Dec. 28, 2022, which claims priority to Chinese Patent Application No. 202111646679.8, filed Dec. 29, 2021. The entire contents of each of the above-identified applications are expressly incorporated herein by reference.

TECHNICAL FIELD

This application relates to the field of communication technologies, and specifically, to an electronic device.

BACKGROUND

With the development of communication technologies, a display screen size of an electronic device is getting larger and larger. The larger display screen can not only improve aesthetics of the electronic device, but also bring better visual impact to users, thereby improving user experience of the electronic device.

However, as the display screen size increases, an overall size of the electronic device also increases, making it inconvenient for users to carry. To resolve this problem, foldable screen electronic devices have emerged on the market. A display screen of the electronic device is a flexible display screen, and a size of a display area can be changed by folding and unfolding the electronic device, so that a larger display area can be obtained, and a size of the electronic device can be reduced by folding the electronic device, thereby making it easier for the user to carry.

However, due to impact of a bending radius of the electronic device, during the process of folding or unfolding the electronic device, the flexible display screen is easily wrinkled and delaminated due to excessive squeezing, or is broken due to excessive pulling. Therefore, this type of electronic device has a problem of a short lifespan of its flexible display screen.

SUMMARY

Embodiments of this application provide an electronic device, including a first device body, a second device body, a rotating mechanism, and a flexible display screen, and the flexible display screen includes a first display screen, a second display screen, and a third display screen.

The first device body is rotationally connected to the second device body through the rotating mechanism.

The first display screen is connected to the second display screen through the third display screen.

The first device body is connected to the first display screen, and the second device body is connected to the second display screen.

The rotating mechanism includes a rotating shaft, a transmission apparatus, and a moving component, the moving component is equipped with a first transmission tooth that meshes with the transmission apparatus, the rotating shaft is connected to the moving component through the transmission apparatus, and at least one of the first device body and second device body is connected to the moving component.

The first device body and the second device body can rotate relative to each other, so that the electronic device switches between a folded state and an unfolded state, and in a case that the electronic device switches from the folded state to the unfolded state, the rotating shaft drives the moving component away from the rotating shaft through the transmission apparatus; or in a case that the electronic device switches from the unfolded state to the folded state, the rotating shaft drives, through the transmission apparatus, the moving component to approach the rotating shaft.

DETAILED DESCRIPTION

The embodiments of this application are described below with reference to the accompanying drawings in embodiments of this application. Apparently, the described embodiments are merely some rather than all of embodiments of this application. All other embodiments obtained by a person skilled in the art based on embodiments of this application without creative efforts shall fall within the protection scope of this application.

The terms such as "first" and "second" in the specification and claims of this application are used to distinguish between similar objects but not to describe a specific order or sequence. It should be understood that data used in this way are interchangeable in appropriate circumstances, so that embodiments of this application can be implemented in an order other than those illustrated or described herein. In addition, "and/or" in the specification and claims indicates at least one of connected objects, and the character "/" generally indicates that the related objects are in an "or" relationship.

An electronic device provided in embodiments of this application is described in details below with reference to the accompanying drawings by using specific embodiments and application scenarios.

Figure 1:
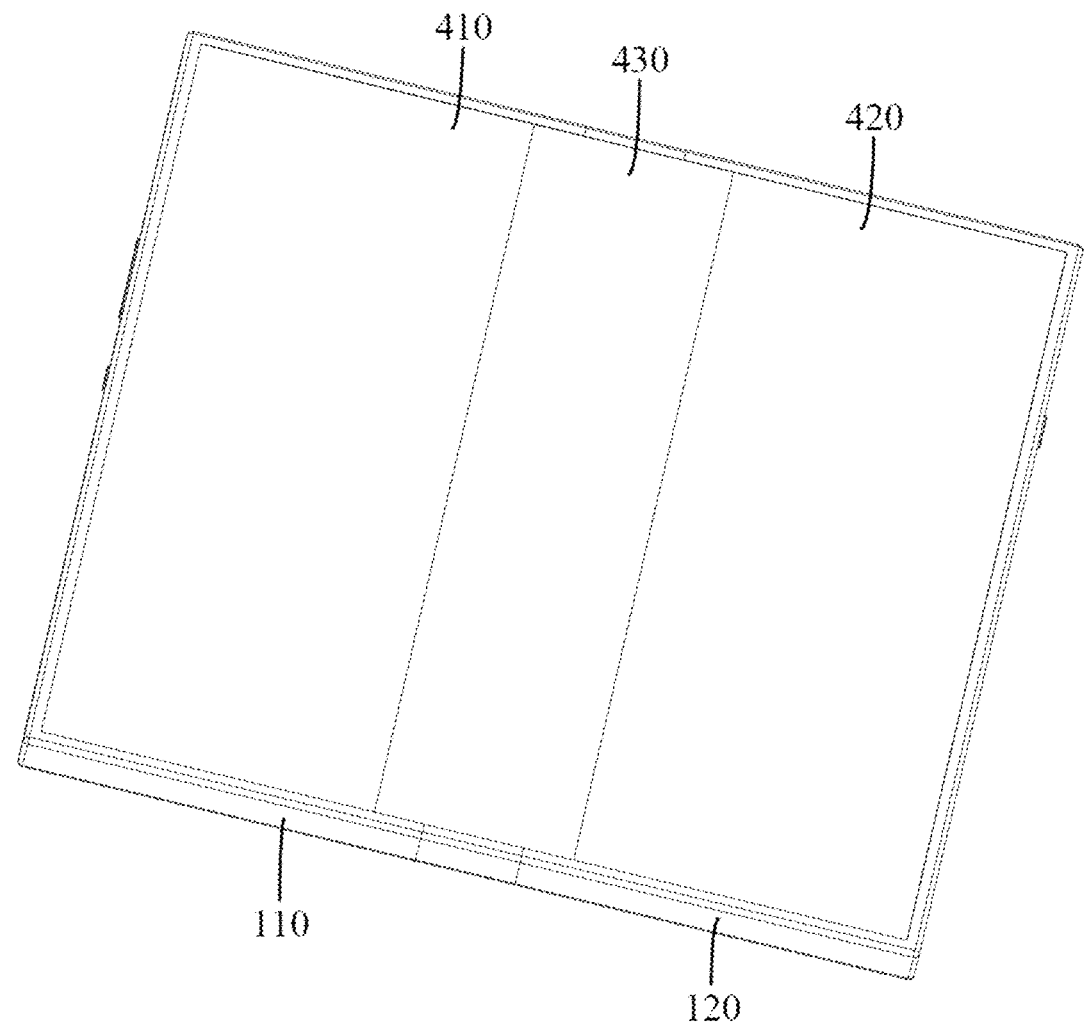
FIG. 1 is a block diagram of an electronic device when the electronic device is in an unfolded state according to an embodiment of this application.
Figure 2:
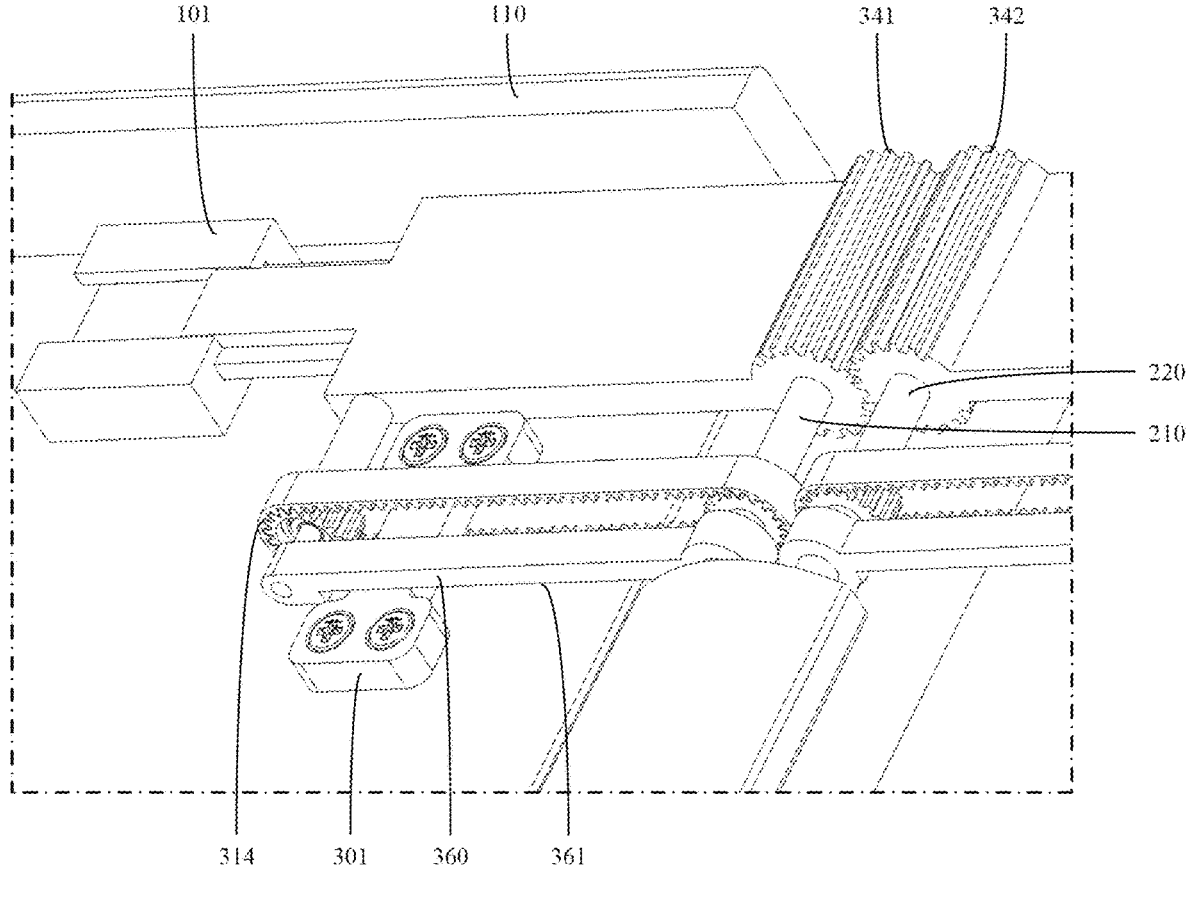
FIG. 2 is a partial enlarged view of an electronic device when the electronic device is in an unfolded state according to an embodiment of this application.
Figure 3:
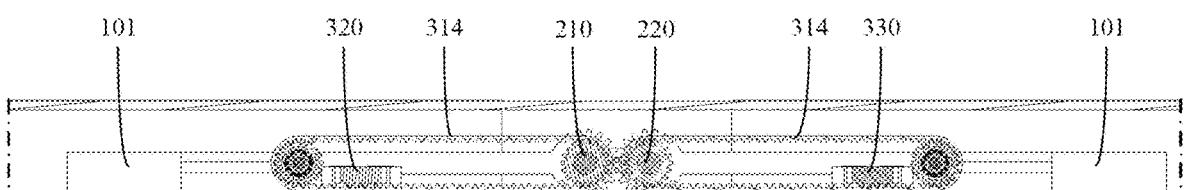
FIG. 3 is a partial sectional view of an electronic device when the electronic device is in an unfolded state according to an embodiment of this application.
Figure 4:
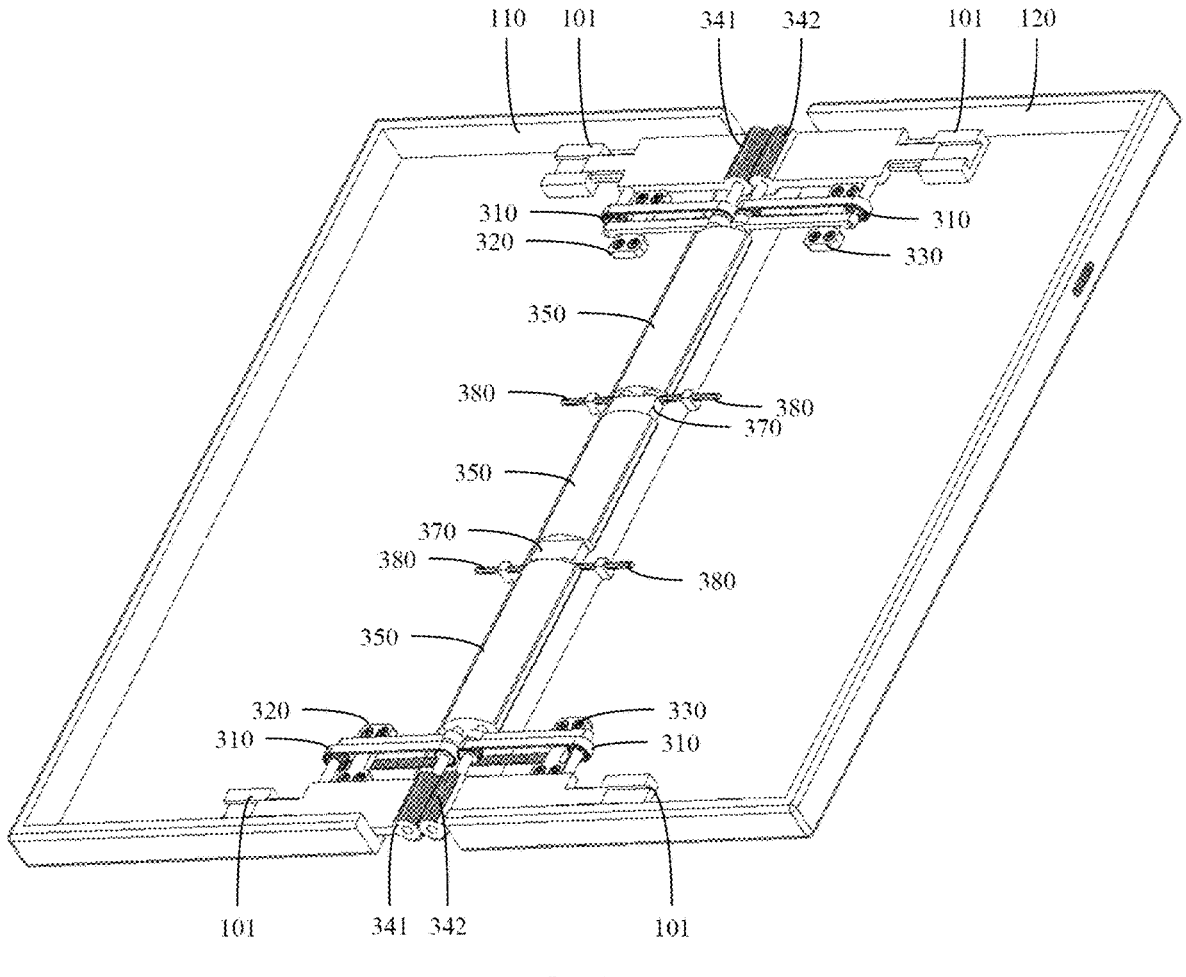
FIG. 4 is a block diagram of a part of an electronic device when the electronic device is in an unfolded state according to an embodiment of this application.
Figure 5:
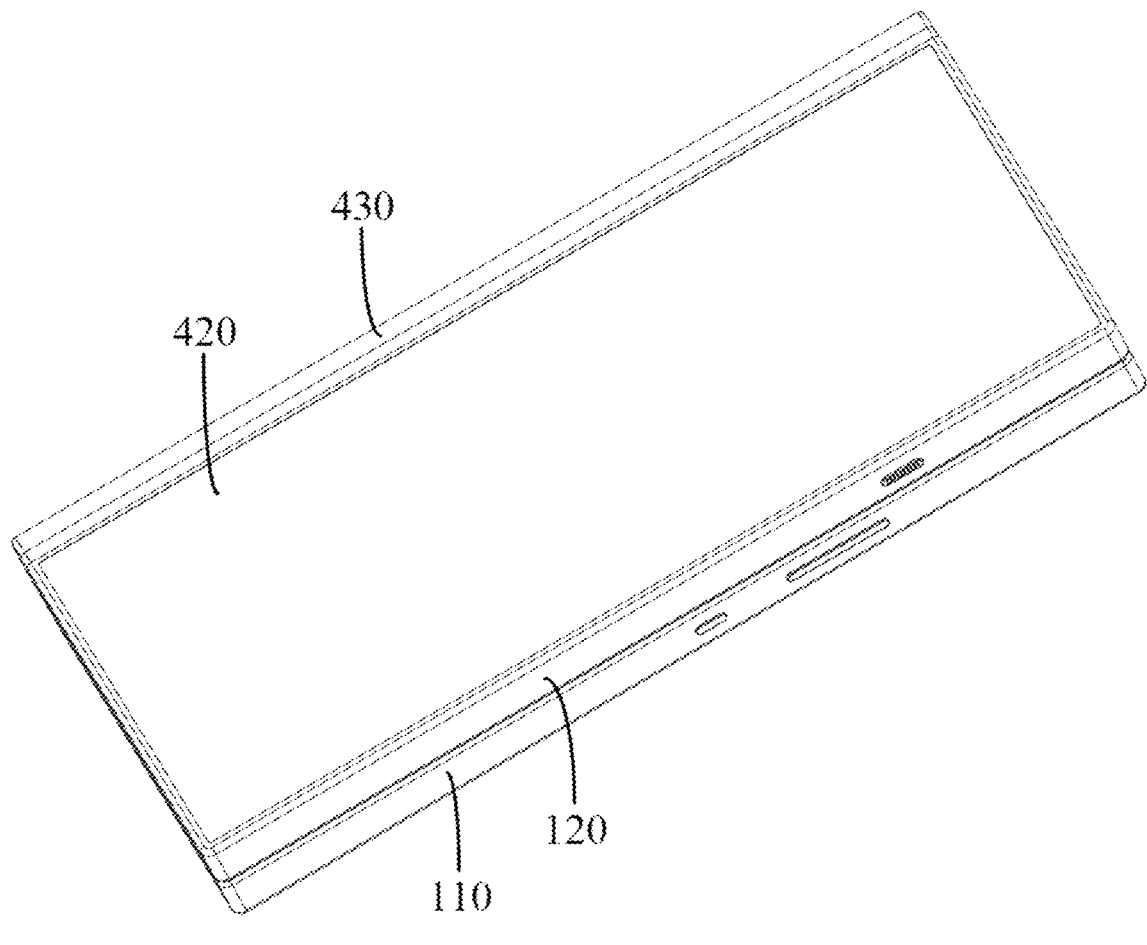
FIG. 5 is a block diagram of an electronic device when the electronic device is in a folded state according to an embodiment of this application.
Figure 6:
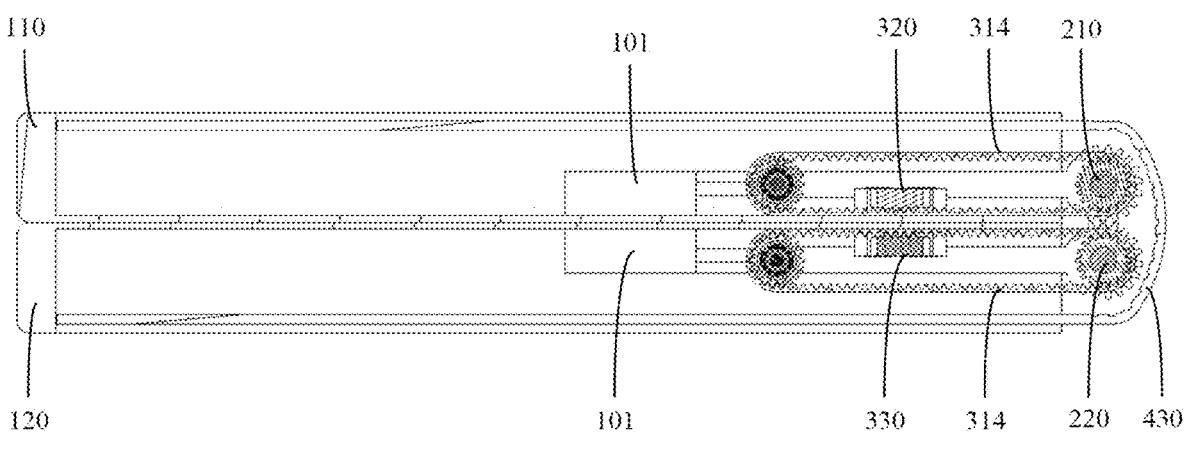
FIG. 6 is a sectional view of an electronic device when the electronic device is in a folded state according to an embodiment of this application.
Figure 7:
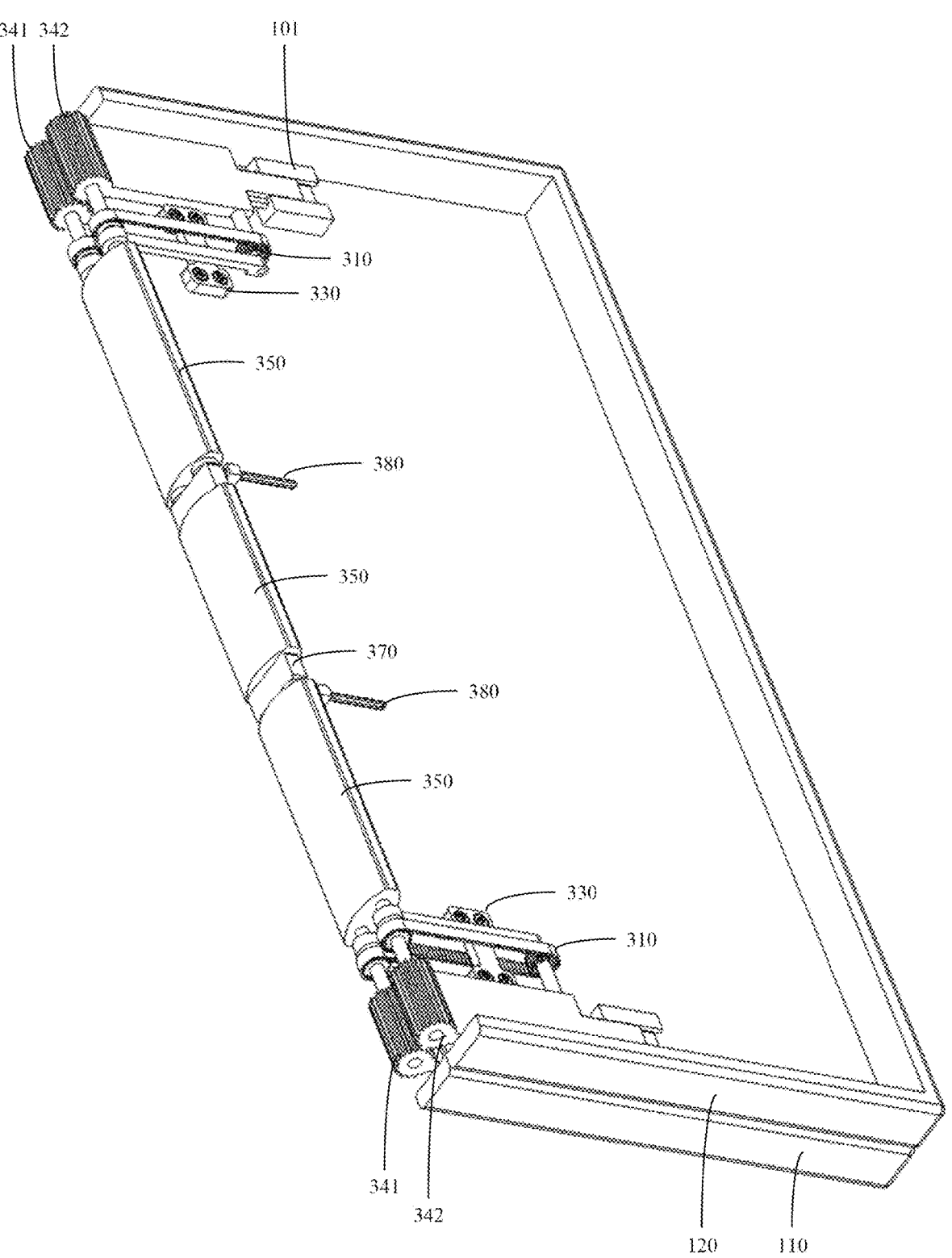
FIG. 7 is a block diagram of a part of an electronic device when the electronic device is in a folded state according to an embodiment of this application.
Figure 8:
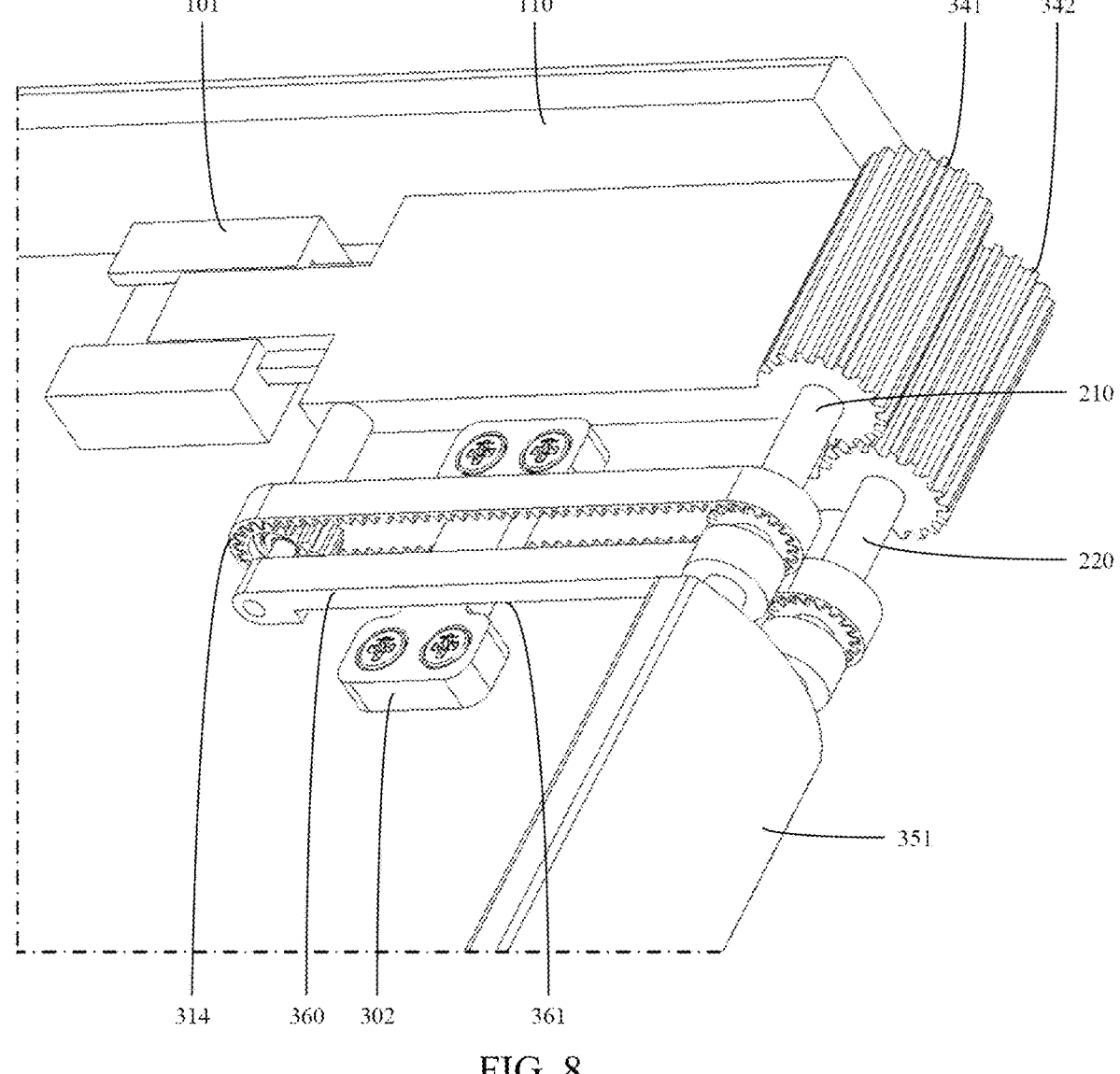
FIG. 8 is a partial enlarged view of a part of an electronic device when the electronic device is in a folded state according to an embodiment of this application.
Figure 9:
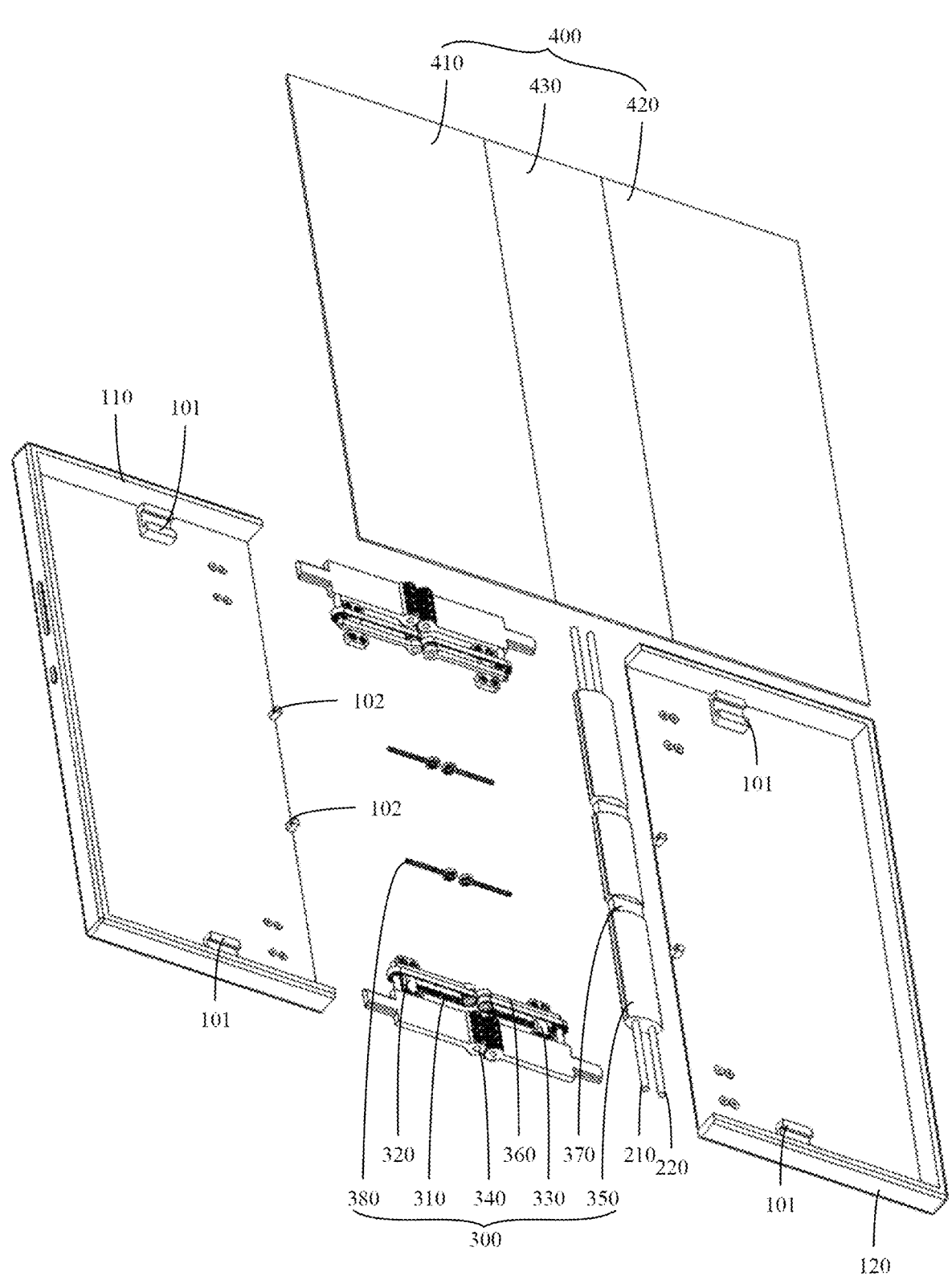
FIG. 9 is an exploded view of an electronic device according to an embodiment of this application.
Figure 10:
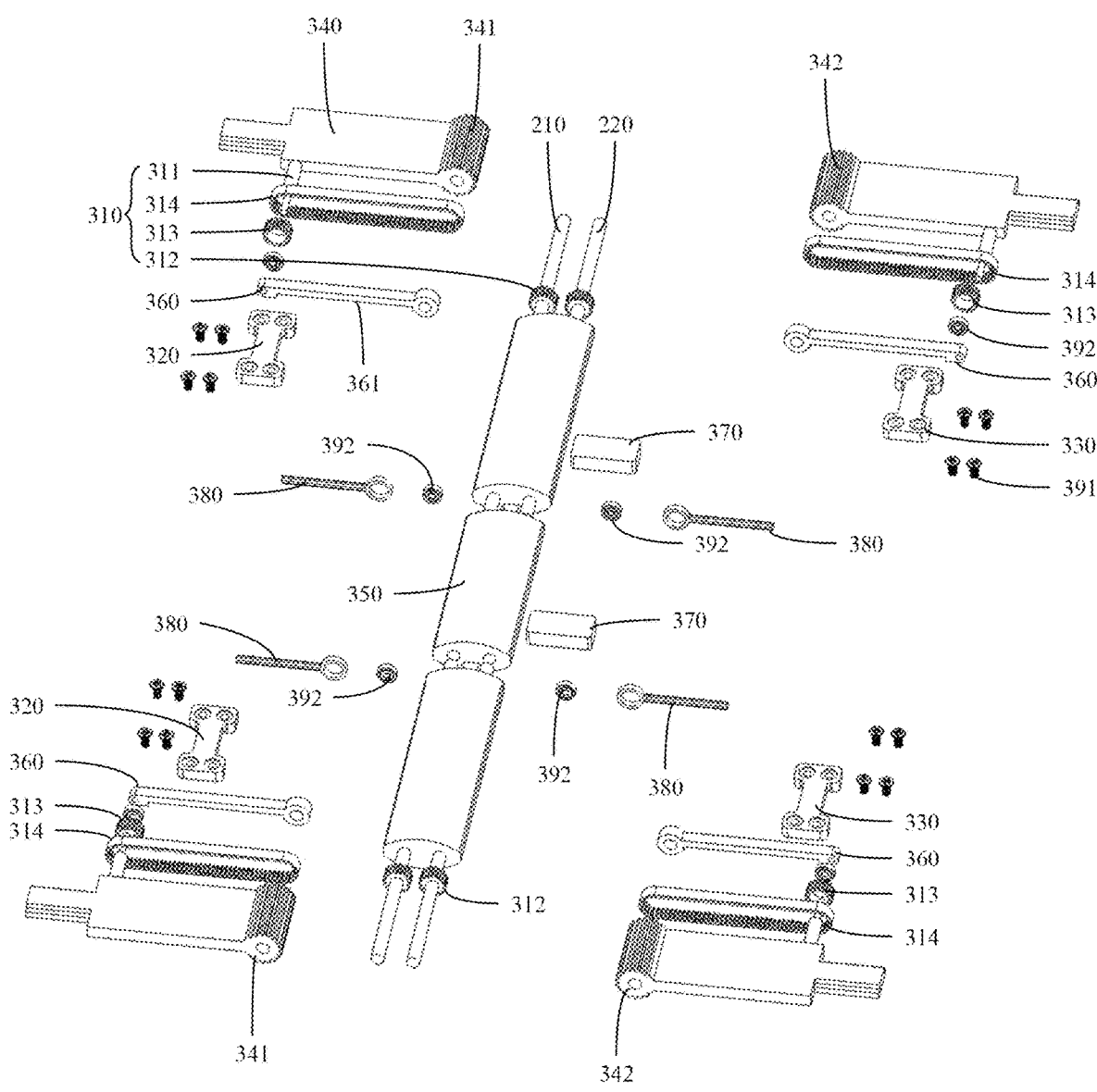
FIG. 10 is an exploded view of a rotating shaft and a rotating mechanism according to an embodiment of this application.
Figure 11:
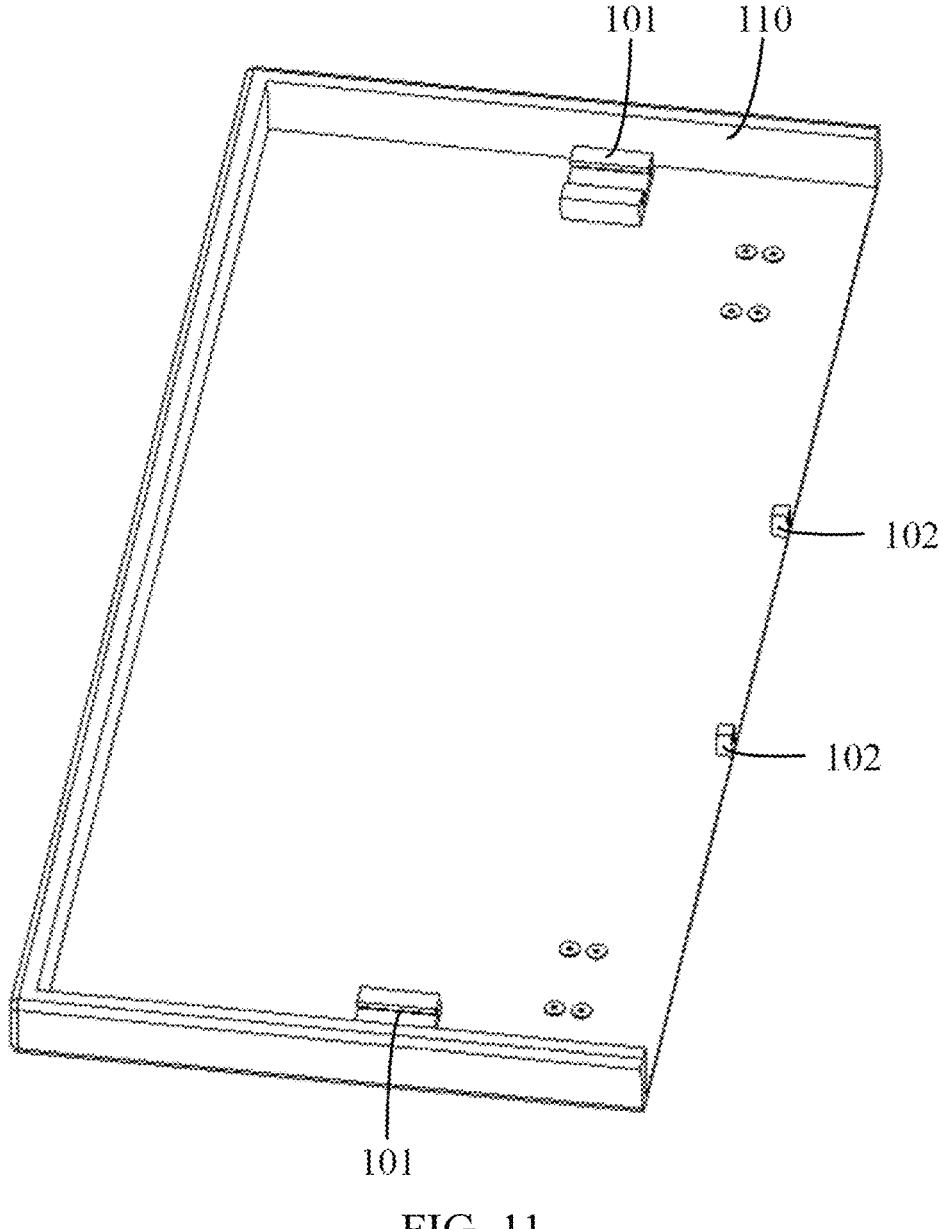
FIG. 11 is a block diagram of a first device body according to an embodiment of this application.
Figure 12:
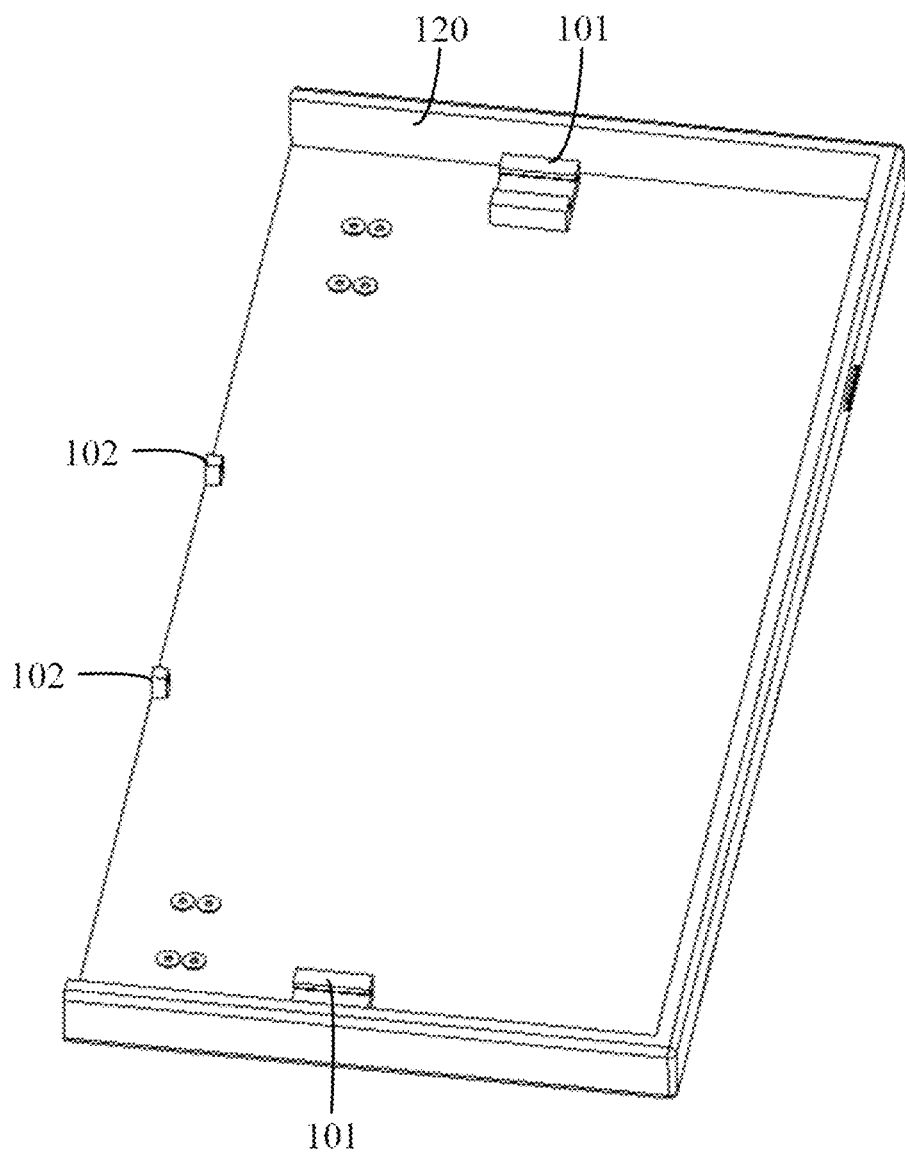
FIG. 12 is a block diagram of a second device body according to an embodiment of this application.
Figure 13:
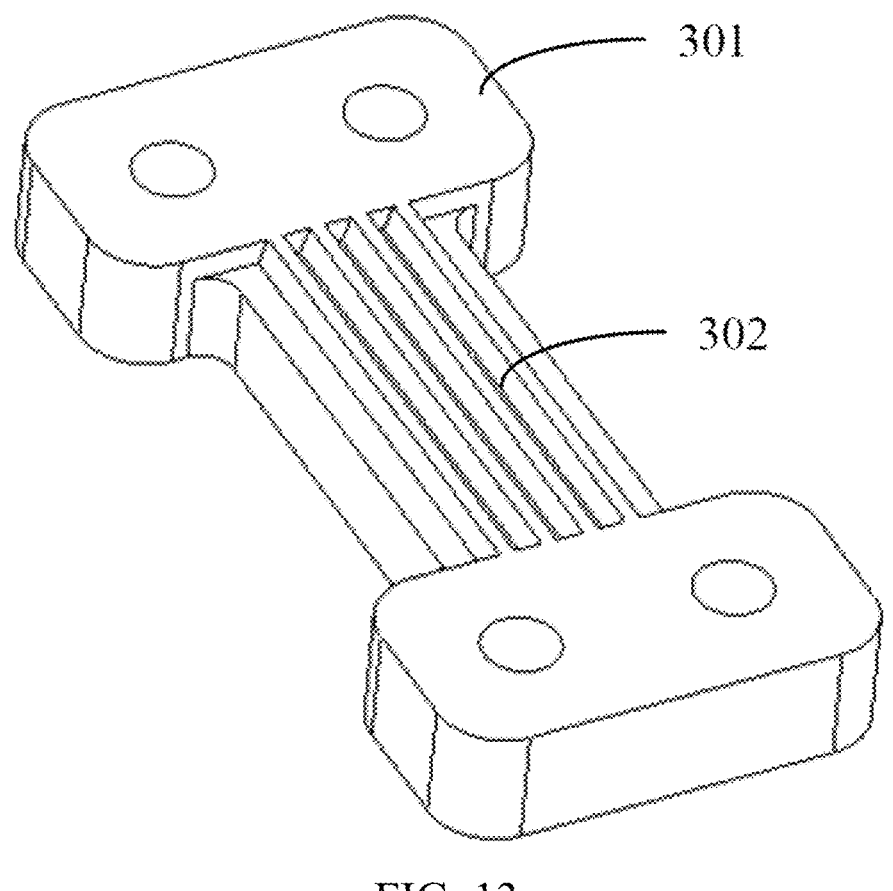
FIG. 13 is a block diagram of a moving component according to an embodiment of this application.

Refer to FIG. 1 to FIG. 3. Embodiments of this application disclose an electronic device, including a first device body 110, a second device body 120, a rotating mechanism 300, and a flexible display screen 400.

The first device body 110 and the second device body 120 may serve as basic parts of the electronic device, thereby providing an installation foundation for the flexible display screen 400, circuit boards, batteries and other components. The first device body 110 and the second device body 120 each may include components such as a frame and a mainboard upper cover connected to the frame. The first device body 110 is rotationally connected to the second device body 120 through the rotating mechanism 300. The first device body 110 and the second device body 120 may rotate relative to each other, so that the electronic device switches between a folded state and an unfolded state. In other words, during the process of folding or unfolding the electronic device, the first device body 110 and the second device body 120 may rotate relative to each other. In a case that the electronic device is in the unfolded state, a display area of the flexible display screen 400 is larger, thereby satisfying user's requirement for a large display screen; or in a case that the electronic device is in the folded state, an overall size of the electronic device is smaller, making it easier for the user to carry and hold the electronic device.

The flexible display screen 400 includes a first display screen 410, a second display screen 420, and a third display screen 430. The first display screen 410 is connected to the second display screen 420 through the third display screen 430, so that the three can be fixedly spliced into a complete display area. It is clear that, the first display screen 410, the second display screen 420, and the third display screen 430 may be displayed independently. The first device body 110 may be connected to the first display screen 410 in bonding or other manners, and the second device body 120 can be connected to the second display screen 420 in bonding or other manners. Therefore, during the process of folding or unfolding the electronic device, driven by the first device body 110 and the second device body 120, the first display screen 410 and the second display screen 420 may rotate relative to each other, and the third display screen 430 may be deformed to adapt to an angle change between the first display screen 410 and the second display screen 420.

The flexible display screen 400 may be an external foldable display screen. In some implementations, in a case that the electronic device is in the folded state, the first device body 110 and the second device body 120 are both located between the first display screen 410 and the second display screen 420, in this case, the first device body 110 and the second device body 120 are located within space enclosed by the flexible display screen 400. The flexible display screen 400 may be an internal foldable display screen. In some implementations, in a case that the electronic device is in the folded state, the first display screen 410 and the second display screen 420 are both located between the first device body 110 and the second device body 120, in this case, the first display screen 410 and the second display screen 420 are located in space between the first device body 110 and the second device body 120. Relatively speaking, when the flexible display screen 400 is an internal foldable display screen, in a case that the electronic device is in the folded state, the flexible display screen 400 is prone to creases due to extrusion of the first device body 110 and the second device body 120. In addition, dust and other particles in an external environment may easily enter the electronic device or the flexible display screen 400 due to an inability of the flexible display screen 400 to fit completely. In a case that the flexible display screen 400 is an external foldable display screen, the first device body 110 and the second device body 120 basically do not squeeze the flexible display screen 400, and therefore, the flexible display screen 400 is less prone to creases. In addition, dust and other particles in the external environment are less likely to enter the electronic device or the flexible display screen 400 due to the inability of the flexible display 400 to fit completely. In addition, because the external foldable screen is always exposed, regardless of whether the electronic device is in the folded or unfolded state, the flexible display screen 400 can display, to better meet the user's display requirement.

The rotating mechanism 300 includes a rotating shaft, a transmission apparatus 310, and a moving component 301, the moving component 301 is equipped with a first transmission tooth 302 that meshes with the transmission apparatus 310, the rotating shaft is connected to the moving component 301 through the transmission apparatus 310, and at least one of the first device body 110 and the second device body 120 is connected to the moving component 301. That is, the transmission apparatus 310 can be connected to the first device body 110 through the moving component 301; or the transmission apparatus 310 is connected to the second device body 120 through the moving component 301; or at least one transmission apparatus 310 is connected to the first device body 110 through at least one moving component 301, and at the same time, at least one other transmission apparatus 310 is connected to the first device body 110 through at least one other moving component 301.

During the process of folding or unfolding the electronic device, the first device body 110 and the second device body 120 may rotate around the rotating shaft, at the same time, the transmission apparatus 310 can transmit force outputted by the rotating shaft to at least one of the first device body 110 and the second device body 120 through the moving component 301, so that at least one of the first device body 110 and the second device body 120 can move under a trigger of the folding operation or the unfolding operation. At least one of the first device body 110 and the second device body 120 may be defined as a target device body. During the process of folding or unfolding the electronic device, a distance of the target device body relative to the rotating shaft may dynamically change, and the distance between the target device body and the rotating shaft may be defined as a first distance. Since the first distance changes as an included angle between the first device body 110 and the second device body 120 changes, and the change of the included angle causes a change in a bending angle of the flexible display screen 400, there is a correspondence between the first distance and the bending angle of the flexible display screen 400.

In some implementations, the first transmission tooth 302 equipped on the moving component 301 may be a strip groove. A number of strip grooves is at least two, the strip grooves may be arranged in parallel, and each strip groove may extend in a direction parallel to the rotating shaft. The transmission apparatus 310 is equipped with a structure that meshes with the strip groove to transmit the force. In addition, the moving component 301 may be fixedly connected to the first device body 110 or the second device body 120 through connection structures such as a screw 391.

Only one transmission apparatus 310 and one moving component 301 may be equipped. In this case, the rotating shaft is transmission connected only to the first device body 110 or the second device body 120 through the transmission apparatus 310 and the moving component 301. In some implementations, at least two transmission apparatuses 310 and at least two moving component 301 are equipped, and the rotating shaft is transmission connected to the first device body 110 through at least one transmission apparatus 310 and at least one moving component 301, while the rotating shaft is transmission connected to the second device body 120 through at least one other transmission apparatus 310 and at least one other moving component 301.

In some implementations, the number of the moving components 301 is at least two, including a first moving component 320 and a second moving component 330. The rotating shaft is connected to the first moving component 320 through at least one transmission apparatus 310, and the rotating shaft is connected to the second moving component 330 through at least one other transmission apparatus 310. The first moving component 320 is connected to the first device body 110, and the second moving component 330 is connected to the second device body 120. The first moving component 320 may be fixedly connected to the first device body 110 through connection structures such as the screw 391, the second moving component 330 may also be fixedly connected to the second device body 120 through connection structures such as the screw 391. The first moving component 320 and the second moving component 330 may both adopt a bar structure, and may both be parallel to the rotating shaft, thereby facilitating a layout design of the electronic device. In a case that the electronic device switches from the folded state to the unfolded state, the rotating shaft drives the first moving component 320 and the second moving component 330 away from the rotating shaft through the transmission apparatus 310; or in a case that the electronic device switches from the unfolded state to the folded state, the rotating shaft drives, through the transmission apparatus 310, the first moving component 320 and the second moving component 330 to approach the rotating shaft.

In addition, the rotating shaft may be transmission connected to the first device body 110 through at least two transmission apparatuses 310 and at least two first moving components 320 at the same time. In some implementations, the rotating shaft may be transmission connected to the second device body 120 through at least two transmission apparatuses 310 and at least two second moving components 330 at the same time, thereby improving connection reliability. When a number of each of the transmission apparatuses 310, the first moving components 320, and the second moving components 330 is at least two, specific structures of all transmission apparatuses 310, all first moving components 320, and all second moving components 330 may be the same or different. This is not limited in embodiments of this application.

In embodiments of this application, in a case that the electronic device switches from the folded state to the unfolded state, the rotating shaft drives the moving component 301 away from the rotating shaft through the transmission apparatus 310. In this case, at least one of the first device body 110 and the second device body 120 is away from the rotating shaft, so that a support length of the first device body 110 and the second device body 120 for the flexible display screen 400 becomes larger, to prevent the third display screen 430 of the flexible display screen 400 from being wrinkled and delaminated due to excessive squeezing. In a case that the electronic device switches from the unfolded state to the folded state, the rotating shaft drives, through the transmission apparatus 310, the moving component 301 to approach the rotating shaft. In this case, at least one of the first device body 110 and the second device body 120 is close to the rotating shaft, so that the support length of the first device body 110 and the second device body 120 for the flexible display screen 400 becomes smaller, to prevent the third display screen 430 of the flexible display screen from being broken due to excessive pulling. It can be seen that the first device body 110 and the second device body 120 can move relative to the rotating shaft with the folding or unfolding of the electronic device, so that the flexible display screen 400 is not damaged due to the folding or unfolding of the electronic device, and therefore, the flexible display screen 400 has a longer lifespan.

In some implementations, only one rotating shaft may be equipped, the rotating shaft may be connected to the first device body 110 or the second device body 120 only through the transmission apparatus 310. However, such setting results in a longer movement stroke of the first device body 110 or the second device body 120, and during the process of folding or unfolding the electronic device, a center of gravity of the entire electronic device is prone to instability. Therefore, in other embodiments, a number of the rotating shafts may be at least two, including a first shaft 210 and a second shaft 220. The first shaft 210 and the second shaft 220 may be parallel to each other. The first shaft 210 may be connected to the first moving component 320 through at least one transmission apparatus 310, thereby being connected to the first device body 110, and the second shaft 220 may be connected to the second moving component 330 through at least one transmission apparatus 310, thereby being connected to the second device body 120. In a case that the electronic device switches from the folded state to the unfolded state, the first shaft 210 drives the first device body 110 away from the rotating shaft through the transmission apparatus 310 and the first moving component 320, and the second shaft 220 drives the second device body 120 away from the rotating shaft through the transmission apparatus 310 and the second moving component 330. In a case that the electronic device switches from the unfolded state to the folded state, the first shaft 210 drives, through the transmission apparatus 310 and the first moving component 320, the first device body 110 to approach the rotating shaft, and the second shaft 220 drives, through the transmission apparatus 310 and the second moving component 330, the second device body 120 to approach the rotating shaft.

Further, the rotating mechanism 300 includes a rotating shaft bracket 350. The rotating shaft bracket 350 is equipped with a first hole and a second hole. One end of the first shaft 210 passes through the first hole, and one end of the second shaft 220 passes through the second hole. In other words, the first shaft 210 can be connected to the second shaft 220 through the rotating shaft bracket 350. In some implementations, the rotating shaft bracket 350 is equipped with an arc-shaped support surface 351, and in a case that the electronic device is in the folded state, the arc-shaped support surface 351 faces the third display screen 430. In a case that the electronic device is in the folded state, the arc-shaped support surface 351 may contact the third display screen 430, thereby supporting the third display screen 430; in some implementations, there may be a small gap between the arc-shaped support surface 351 and the third display screen 430, and when the third display screen 430 is pressed, the arc-shaped support surface 351 contacts the third display screen 430, thereby supporting the third display screen 430.

In this case, the rotating shaft bracket 350 can connect the first shaft 210 and the second shaft 220, and support the third display screen 430 in an appropriate occasion, thereby improving flatness of the third display screen 430, facilitating user's touch operation and protecting the third display screen 430.

When the flexible display screen 400 is an internal foldable display screen, the arc-shaped support surface 351 equipped on the rotating shaft bracket 350 may be a concave surface, the concave surface is concaved in a direction away from the third display screen 430, thereby increasing a support area of the arc-shaped support surface 351 for the third display screen 430. When the flexible display screen 400 is an external foldable display screen, the arc-shaped support surface 351 equipped on the rotating shaft bracket 350 may be a convex surface, the convex surface protrudes in a direction toward the third display screen 430, thereby increasing a support area of the arc-shaped support surface 351 for the third display screen 430.

During the process of folding or unfolding the electronic device, the first shaft 210 and the second shaft 220 rotate at the same time. To improve synchronization of the rotation of the two, elastic components made of rubber or other materials may be provided at ends of the two, and synchronous rotation between the first shaft 210 and the second shaft 220 can be achieved through friction between the elastic components. However, since the elastic components easily slip, the synchronization of the rotation of the first shaft 210 and the second shaft 220 is poor. To resolve this problem, in an embodiment, the rotating mechanism further includes a support plate 340, and a number of support plates 340 is at least two. At least one support plate 340 is connected to the first shaft 210, and at least one other support plate 340 is connected to the second shaft 220. A support plate 340 connected to the first shaft 210 includes a first gear portion 341, and a support plate 340 connected to the second shaft 220 includes a second gear portion 342. The first gear portion 341 is sleeved on the first shaft 210, the second gear portion 342 is sleeved on the second shaft, and the first gear portion 341 meshes with the second gear portion 342. The support plate 340 connected to the first shaft 210 may further include a portion that is slidably connected to the first device body 110, and the support plate 340 connected to the second shaft 220 may further include a portion that is slidably connected to the second device body 120. During the folding or unfolding process of the electronic device, through meshing between the first gear portion 341 and the second gear portion 342, the first device body 110 can rotate relative to the second device body 120, and the first gear portion 341 and the second gear portion 342 respectively drive the first shaft 210 and the second shaft 220 to rotate synchronously. Since a transmission manner of tooth meshing is more reliable, this embodiment can improve the synchronization of the rotation of the first shaft 210 and the second shaft 220. In addition, the meshing between the first gear portion 341 and the second gear portion 342 may create a specific damping sense during the folding or unfolding process of the electronic device, preventing collision and other problems caused by a relative rotation speed between the first device body 110 and the second device body 120 being excessively high. Damping force between the first gear portion 341 and the second gear portion 342 may be optimized, so that the electronic device can be folded or unfolded relatively easily when a user applies force to the electronic device. In addition, when the user removes the force in expectation of keeping the electronic device at any angle, the first device body 110 and the second device body 120 can remain in a target position.

In an embodiment, the support plate 340 may be of an integrated structure, thereby simplifying an assembly process of the electronic device. In some implementations, the support plate 340 may adopt a split structure. When an abrasion of the first gear portion 341 or the second gear portion 342 exceeds an acceptable range, only the first gear portion 341 or the second gear portion 342 may be replaced.

When the rotating mechanism 300 further includes the support plate 340, the support plate 340 is connected to the rotating shaft, and the support plate 340 may serve as a setting basis for the transmission apparatus 310, thereby facilitating installation of the transmission apparatus 310. The transmission apparatus 310 may convert rotations of the rotating shaft into movements of the first device body 110 and/or the second device body 120. There are many solutions to achieve this goal, for example, the transmission apparatus 310 may include a lead screw nut mechanism, and so on. In an embodiment, the transmission apparatus includes a support shaft 311, a first gear 312, a second gear 313, and a synchronous belt 314, a first end of the support shaft 311 is connected to the support plate 340, the first gear 312 is sleeved on the rotating shaft, the second gear 313 is sleeved on the support shaft 311, the first gear 312 is transmission connected to the second gear 313 through the synchronous belt 314, and the synchronous belt 314 meshes with the moving component 301. When the rotating shaft rotates, the first gear 312 rotates accordingly, thereby driving the synchronous belt 314 to move. Since the synchronous belt 314 and the first gear 312 and the synchronous belt 314 and the second gear 313 all adopt a tooth meshing structure, a motion accuracy of the synchronous belt 314 is relatively high, thereby improving a transmission accuracy when the rotating shaft drives the moving component 301 to move.

In some implementations, a transmission ratio may be adjusted by adjusting structural parameters (such as a number of teeth, a diameter, and a length) of the first gear 312, the second gear 313, and the synchronous belt 314, so that a movement distance of the moving component 301 better matches the bending angle of the flexible display screen 400, thereby more effectively preventing the flexible display screen 400 from being excessively squeezed or pulled. In addition, the second gear 313 may be sleeved on the support shaft 311 through a bearing 392, so that a movement of the support shaft 311 and a movement of the second gear 313 are independent of each other, avoiding mutual interferences.

An outer surface of the synchronous belt 314 may be equipped with a structure for meshing with the first transmission tooth 302; or an inner surface of the synchronous belt may be equipped with a second transmission tooth, the moving component 301 is equipped with a first surface facing the inner surface, the first surface is equipped with the first transmission tooth 302, and the second transmission tooth meshes with the first transmission tooth 302. When the latter embodiment is adopted, a portion of the synchronous belt 314 is located between the first surface of the moving component 301 and the first device body 110 (or the second device body 120). Therefore, distribution of the synchronous belt 314 and the moving component 301 is more compact, and space occupied by both is smaller. At the same time, the synchronous belt 314 may only be equipped with the second transmission tooth on the inner surface, the second transmission tooth may mesh with the first gear 312, the second gear 313, and the moving component 301. Therefore, a structure of the synchronous belt 314 is simpler and a structural strength of the synchronous belt 314 is higher.

In a further embodiment, the rotating mechanism further includes a connecting rod 360. One end of the connecting rod 360 is sleeved on the rotating shaft, and the other end of the connecting rod 360 is sleeved on a second end of the support shaft 311. In other words, the second end of the support shaft 311 is connected to the rotating shaft through the connecting rod 360. In this embodiment, the connecting rod 360 may apply supporting force to the second end of the support shaft 311, to prevent deformation of the support shaft 311 due to factors such as a weight of the second gear 313 and a weight of the synchronous belt 314. Therefore, the synchronous belt 314 is not easily interfered with the first device body 110 or the second device body 120 due to the deformation of the support shaft 311.

The synchronous belt 314 may be located on a side that is of the connecting rod 360 and that is away from the support plate 340. In other words, the connecting rod 360 may be located between the synchronous belt 314 and the support plate 340. In this case, the second end of the support shaft 311 is still cantilevered, resulting in a high probability of deformation of the support shaft 311. To prevent the deformation of the support shaft 311, the synchronous belt 314 may be equipped between the support plate 340 and the connecting rod 360. In this case, the connecting rod 360 can be closer to an end of the support shaft 311, so that the support shaft 311 hardly needs to be cantilevered, and the probability of the deformation of the support shaft 311 is greatly reduced.

The connecting rod 360 may be far away from the moving component 301, to avoid the moving component 301. In some implementations, the moving component 301 may be entirely located between the connecting rod 360 and the support plate 340, but this setting will cause the transmission apparatus 310 to be excessively scattered, thereby occupying excessively large space. Therefore, to reduce the space occupied by the transmission apparatus 310, both the synchronous belt 314 and the connecting rod 360 may be located between two ends of the moving component 301. In this case, a distance between the synchronous belt 314 and the connecting rod 360 is smaller, making the transmission apparatus 310 more compact, thereby achieving the goal of reducing the space occupied by the transmission apparatus 310. Furthermore, a surface of the connecting rod 360 facing the moving component 301 is equipped with an avoidance recess 361, the avoidance recess 361 can avoid the moving component 301, making the distance between the moving component 301 and the connecting rod 360 smaller, and even a part of the moving component 301 may be located in the avoidance recess 361, thereby further reducing the space occupied by the transmission apparatus 310 moving component.

When the rotating mechanism 300 further includes the support plate 340, the support plate 340 is connected to the rotating shaft, the first device body 110 is equipped with a first guide part 101, and one end that is of the support plate 340 connected to the first device body 110 and that is away from the rotating shaft slidably fits with the first guide part 101; and/or the second device body 120 is equipped with a first guide part 101, and one end that is of the support plate 340 connected to the second device body 120 and that is away from the rotating shaft slidably fits with the first guide part 101. The first guide part 101 may provide guidance for movement of the support plate 340, thereby making relative rotation between the first device body 110 and the second device body 120 smoother. In addition, the first guide part

101 may form a specific damping sense during the folding or unfolding process of the electronic device, preventing collision and other problems caused by a relative rotation speed of the first device body 110 and the second device body 120 being excessively high.

Further, in some implementations, the rotating mechanism further includes a damper 370, and the damper 370 is equipped in the rotating shaft. The damper 370 may provide a damping function, thereby forming a specific damping sense during the folding or unfolding process of the electronic device, to prevent collision and other problems caused by a relative rotation speed of the first device body 110 and the second device body 120 being excessively high. In addition, when users expect to keep the electronic device at any angle and remove the force, the damper 370 may keep the first device body 110 and the second device body 120 in a target position. Further, a number of dampers 370 may be at least two, with the dampers 370 arranged at intervals along an axial direction of the rotating shaft to improve a damping effect.

When the rotating mechanism 300 further includes the rotating shaft bracket 350, the rotating shaft bracket 350 may adopt an integrated structure. However, considering that the rotating shaft needs to be sleeved with the first gear portion 341, the second gear portion 342, and the damper 370 at the same time, and the first gear portion 341 and the second gear portion 342 are sleeved at ends of the rotating shaft, there is a gap between the damper 370 and each of the first gear portion 341 and the second gear portion 342. Therefore, to increase a size of the rotating shaft bracket 350 as much as possible to support the rotating shaft and the third display screen 430, a plurality of rotating shaft brackets 350 may be equipped, and the rotating shaft brackets 350 may be arranged at intervals along the axial direction of the rotating shaft, and the damper 370 may be located between adjacent rotating shaft brackets 350.

Further, in some implementations, the first device body 110 is equipped with a second guide part 102, and the rotating mechanism further includes a guide rod 380, one end of the guide rod 380 is sleeved on the rotating shaft, and the other end of the guide rod 380 slidably fits with the second guide part 102; and/or the second device body 120 is equipped with a second guide part 102, the rotating mechanism further includes a guide rod 380, one end of the guide rod 380 is sleeved on the rotating shaft, and the other end of the guide rod 380 slidably fits with the second guide part 102. In some implementations, the guide rod 380 may be sleeved on the rotating shaft through the bearing 392 to alleviate wear between the guide rod 380 and the rotating shaft. The first guide part 101 may provide guidance for relative rotation between the first device body 110 and the second device body 120, thereby making the relative rotation between the first device body 110 and the second device body 120 smoother. In addition, the first guide part 101 may form a specific damping sense during the folding or unfolding process of the electronic device, preventing collision and other problems caused by a relative rotation speed of the first device body 110 and the second device body 120 being excessively high.

In some implementations, the damper 370 may cooperate with the guide rod 380, the damper 370 may include an elastic component, and one end that is of the guide rod 380 and that is sleeved on the rotating shaft is connected to the elastic component. During the folding or unfolding process of the electronic device, the guide rod 380 rotates relative to the damper 370, thereby applying force to the elastic component, causing the elastic component to deform and reserve elastic potential energy, and this elastic potential energy may serve as a damping power for the damper 370, enabling the damper 370 to output damping force. This solution does not need additional components to provide the damping power for the damper 370, thereby simplifying a structure of the electronic device and reducing costs.

A number of the foregoing first guide parts 101 may be set to at least two, and the number of the first guide parts 101 may be equal to a number of the support plates 340, and the first guide part 101 one-to-one corresponds to the support plate 340, thereby improving a guiding effect. The first device body 110 may be equipped with at least two second guide parts 102, the second guide parts 102 may be arranged at intervals along an extension direction of the rotating shaft, and the second guide parts 102 may one-to-one match with a plurality of guide rods 380, thereby improving a guiding effect. The second device body 120 may be equipped with at least two second guide parts 102, the second guide parts 102 may be arranged at intervals along the extension direction of the rotating shaft, and the second guide part 102 may one-to-one match with a plurality of guide rods 380, thereby improving the guiding effect.

The electronic devices disclosed in embodiments of this application may be smartphones, tablets, e-book readers, wearable devices (such as smartwatches), electronic game consoles, or other electronic devices. Types of the electronic devices are not limited in embodiments of this application.

Embodiments of this application have been described above with reference to the accompanying drawings. This application is not limited to the specific embodiments described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An electronic device, comprising:
    a first device body;
    a second device body;
    a rotating mechanism; and
    a flexible display screen, wherein:
        the flexible display screen comprises:
            a first display screen;
            a second display screen; and
            a third display screen;
        the first device body is rotationally connected to the second device body through the rotating mechanism;
        the first display screen is connected to the second display screen through the third display screen;
        the first device body is connected to the first display screen, and the second device body is connected to the second display screen;
        the rotating mechanism comprises:
            a rotating shaft;
            a transmission apparatus; and
            a moving component, wherein the moving component is equipped with a first transmission tooth that meshes with the transmission apparatus, the rotating shaft is connected to the moving component through the transmission apparatus, and at least one of the first device body and the second device body is connected to the moving component; and
        the first device body and the second device body is configured to rotate relative to each other, so that the electronic device switches between a folded state and an unfolded state, and wherein
        when the electronic device switches from the folded state to the unfolded state, the rotating shaft is configured to drive the moving component away from the rotating shaft through the transmission apparatus; or
        when the electronic device switches from the unfolded state to the folded state, the rotating shaft is configured to drive, through the transmission apparatus, the moving component to approach the rotating shaft.

2. The electronic device according to claim 1, wherein the rotating mechanism further comprises a support plate,
    wherein when a number of rotating shafts is at least two, the rotating mechanism further comprises a first shaft and a second shaft,
    wherein the support plate comprises a first gear portion connected to the first shaft, the support plate comprises a second gear portion connected to the second shaft, and
    wherein the first gear portion is sleeved on the first shaft, the second gear portion is sleeved on the second shaft, and the first gear portion meshes with the second gear portion.

3. The electronic device according to claim 2, wherein the rotating mechanism further comprises a rotating shaft bracket,
    wherein the rotating shaft bracket is equipped with a first hole and a second hole,
    wherein one end of the first shaft passes through the first hole, and one end of the second shaft passes through the second hole, and
    wherein the rotating shaft bracket is equipped with an arc-shaped support surface, and when the electronic device is in the folded state, the arc-shaped support surface faces the third display screen.

4. The electronic device according to claim 1, wherein the rotating mechanism further comprises a support plate,
    wherein the support plate is connected to the rotating shaft,
    wherein the transmission apparatus comprises:
        a support shaft;
        a first gear;
        a second gear; and
        a synchronous belt,
        wherein a first end of the support shaft is connected to the support plate, the first gear is sleeved on the rotating shaft, the second gear is sleeved on the support shaft, the first gear is transmission connected to the second gear through the synchronous belt, and the synchronous belt meshes with the moving component.

5. The electronic device according to claim 4, wherein an inner surface of the synchronous belt is equipped with a second transmission tooth, the moving component is equipped with a first surface facing the inner surface, the first surface is equipped with the first transmission tooth, and the second transmission tooth meshes with the first transmission tooth.

6. The electronic device according to claim 4, wherein the rotating mechanism further comprises a connecting rod, wherein one end of the connecting rod is sleeved on the rotating shaft, and the other end of the connecting rod is sleeved on a second end of the support shaft.

7. The electronic device according to claim 6, wherein the synchronous belt is located between the support plate and the connecting rod.

8. The electronic device according to claim 6, wherein the synchronous belt and the connecting rod are both located between two ends of the moving component, and a surface of the connecting rod facing the moving component is equipped with an avoidance recess.

9. The electronic device according to claim 1, wherein the rotating mechanism further comprises a support plate, wherein the support plate is connected to the rotating shaft, the first device body is equipped with a first guide part, and one end of the support plate away from the rotating shaft slidably fits with the first guide part.

10. The electronic device according to claim 1, wherein when the electronic device is in the folded state, the first device body and the second device body are both located between the first display screen and the second display screen.

11. The electronic device according to claim 1, wherein the rotating mechanism further comprises a damper, wherein the damper is equipped in the rotating shaft.

12. The electronic device according to claim 1, wherein the first device body is equipped with a second guide part, the rotating mechanism further comprises a guide rod, wherein one end of the guide rod is sleeved on the rotating shaft, and the other end of the guide rod slidably fits with the second guide part.

\* \* \* \* \*